United States Patent [19]
Ralston

[11] Patent Number: 4,581,483
[45] Date of Patent: Apr. 8, 1986

[54] INTERFACE CIRCUITRY FOR INTERCONNECTING TOUCH TABLET WITH A COMPUTER INTERFACE

[75] Inventor: Paul W. Ralston, Sunnyvale, Calif.

[73] Assignee: Koala Technologies Corporation, San Jose, Calif.

[21] Appl. No.: 595,070

[22] Filed: Mar. 30, 1984

[51] Int. Cl.[4] .......................................... G08C 21/00
[52] U.S. Cl. ...................................... 178/18; 340/709
[58] Field of Search ............................. 178/18, 19, 87; 340/709, 710, 712; 364/520, 521

[56] References Cited

U.S. PATENT DOCUMENTS

| 3,798,370 | 3/1974 | Hurst | 178/18 |
| 3,906,197 | 9/1975 | Grover | 340/709 |
| 3,911,215 | 10/1975 | Hurst et al. | 178/18 |
| 4,079,194 | 3/1978 | Kley | 178/18 |
| 4,214,122 | 7/1980 | Kley | 178/18 |
| 4,291,303 | 9/1981 | Cutler et al. | 340/712 |
| 4,313,113 | 1/1982 | Thornburg | 340/709 |
| 4,319,078 | 3/1982 | Yokoo et al. | 178/18 |

Primary Examiner—Stafford D. Schreyer
Attorney, Agent, or Firm—Terrence E. Dooher; Alan H. MacPherson; Steven F. Caserza

[57] ABSTRACT

Interface circuitry is provided for interconnecting a source of positional data such as a touch tablet with a computer interface. The circuitry acquires voltages from the source of positional data which represent the data. An acquired voltage is compared with a ramped voltage. At the time of crossover the internal capacitor of the computer interface is rapidly charged above the threshold level to provide positional data from the external source to the computer interface.

15 Claims, 19 Drawing Figures

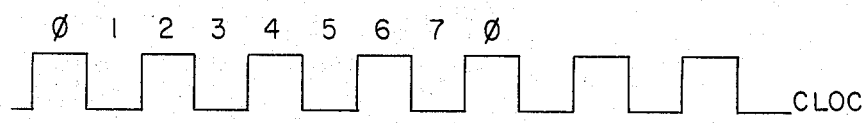
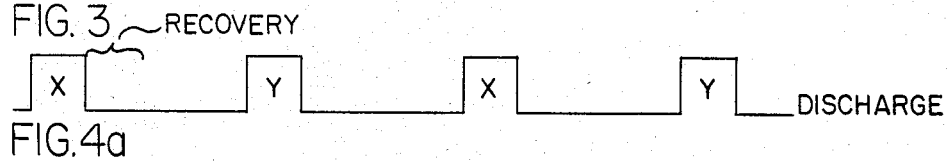
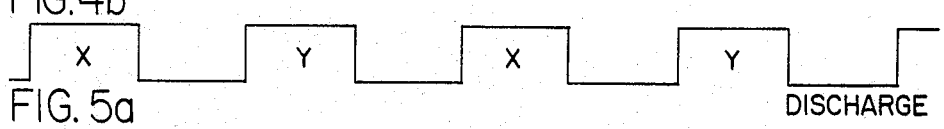
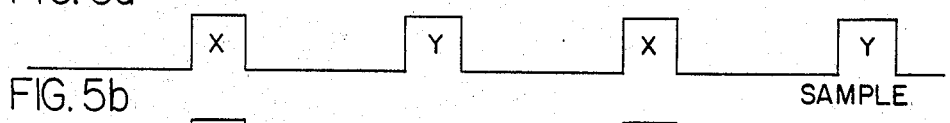
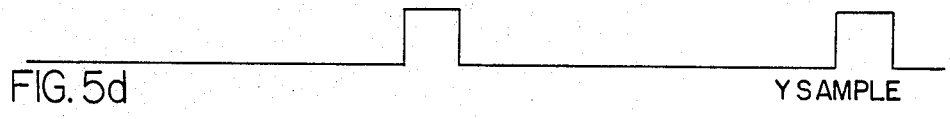
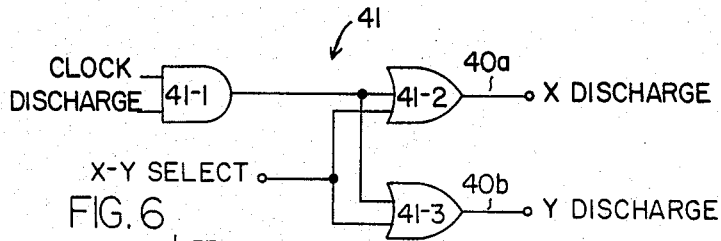
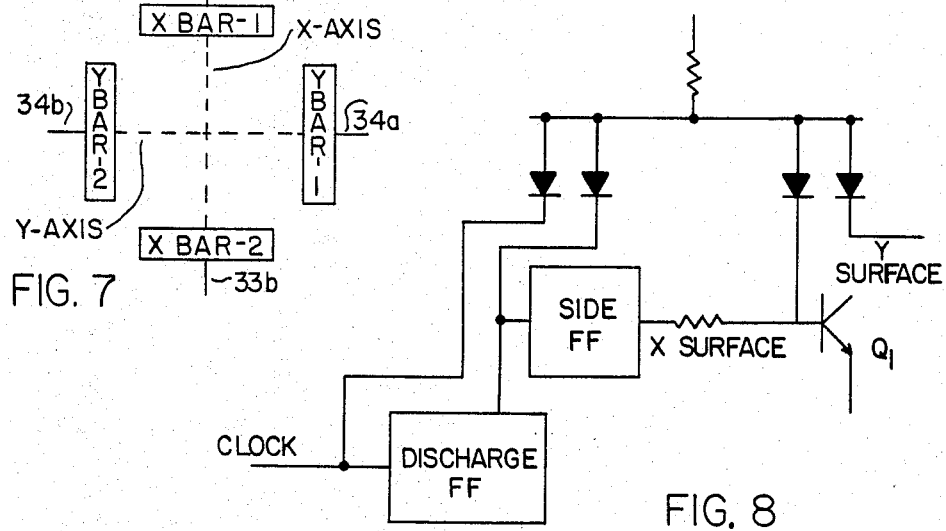

INTERFACE CIRCUITRY FOR INTERCONNECTING TOUCH TABLET WITH A COMPUTER INTERFACE

BACKGROUND OF THE INVENTION

This invention relates to a circuit and method for the acquisition of a voltage signal representing positional information and the conversion thereof into an electrical signal compatible with the analog input channels of a computer interface, so that the voltage signal may be used for controlling character selection on a cathode ray tube (CRT) screen, point identification on diagrams projected onto a CRT screen, or the movement of cursors on a CRT screen, and similar applications. More particularly, this invention relates to the electrical circuitry for interfacing a touch tablet of the type described in co-pending United States Patent application Ser. No. 475,418 filed Mar. 15, 1983, now U.S. pat. No. 4,484,026, with visual displays such as video game displays or computer monitor screens.

Numerous devices, such as personal computers, video games, and monitors containing a cathode ray tube (CRT), are equipped with analog input channels. A device of this type is referred to herein as a "computer interface".

Position sensors for use in controlling the x-y coordinates of a point on a CRT screen are well known. Such systems are described, for example, in D. Thornburg, U.S. Pat. No. 4,313,113; Kley, U.S. Pat. No. 4,079,194; Kley, U.S. Pat. No. 4,214,122; Hurst, et al., U.S. Pat. No. 3,911,215; Hurst, U.S. Pat. No. 3,798,370; and Yokoo, et al., U.S. Pat. No. 4,319,078, which are incorporated herein by reference. Position sensors may be classified into two basic categories depending on the nature of the output of the position sensor.

One type of position sensor provides an electrical resistance whose value represents position information. An example of this type of position sensor is described in Yokoo, et al., U.S. Pat. No. 4,319,078, wherein a position sensor provides two resistances whose magnitudes are proportional to the x and y coordinates, respectively, of a selected point within a two-dimensional medium in the position sensor. These external resistances are then coupled to circuitry in a computer interface which converts each resistance value into a digital number for further use by the computer interface.

A second type of position sensor, as illustrated by Hurst, U.S. Pat. No. 3,798,370, provides an output voltage signal which is derived from position information.

The invention disclosed herein is concerned with position snesors of the second type, i.e., those which provide voltage signals representative of position information. However, before explaining the invention disclosed herein, it will be useful to explain how a typical computer interface processes the positional information made available by a position sensor of the first type.

FIG. 1 shows a section of a typical computer interface 3. Computer interface section 3 is suitable for coupling an external resistance 10 provided by a position sensor of the first type between input lead 5 and input pin P.

A typical computer interface has one or more sections identical to the section shown in FIG. 1, except that a single bit rate clock 4 is common to all sections.

If a position sensor of the first type makes two resistances available, an x-resistance and a y-resistance, representing the x and y coordinates respectively of a point on a two dimensional medium, then the computer interface is assumed to have at least two sections, an x-section and a y-section identical to the computer interface section 3 shown in FIG. 1 for coupling to the x-resistance and the y-resistance respectively. In the two dimensional cases, the elements shown in FIG. 1 will be denoted by prefixing an x- or y- to the element named (except for bit rate clock 4, which is assumed to be a common clock).

In general if a position sensor of the first type makes N resistances available representing the coordinates of a point in N dimensional space, then the computer interface is assumed to have N sections identical to the section shown in FIG. 1, where each of the N resistances 10 is coupled between input lead 5 and input pin P of a corresponding section.

Computer interface section 3 contains a lead 5 which is connected at one end to a supply voltage having a magnitude $V_{cc}$. Voltage divider 17 is connected between lead 5 and ground. The output signal of voltage divider 17 serves as a first input signal on input lead 18 of voltage comparator 13. Capacitor 11 is connected between lead 16 and ground. One end of lead 16 serves as a second input lead of comparator 13 and the other end of lead 16 is connected to an input pin P via internal resistor R. R is typically between 100 ohms and 2.2 K ohms.

When an external resistance 10 provided by a position sensor of the first type (shown as an input paddle in FIG. 1) is coupled between lead 5 and input pin P, capacitor 11 within computer interface section 3 is charged through the variable resistor 10 of the input paddle. Variable resistor 10 typically has a value between 60 K ohms and 1 megohm.

The precise operation of computer interface section 3 depends on whether the computer interface is synchronous or asynchronous. For a synchronous computer interface, such as those made by Atari and the Commodore 20, the charging and discharging cycle of internal capacitor 11 contains a charging phase of a fixed length of time followed by a clamping phase of fixed length of time. The charging and discharging cycle is short, typically 1/60 second. The internal capacitor 11 is charged during the charging phase and is discharged during the clamping phase.

The count in digital counter 15 is set to zero during the discharge phase. During the charging phase the count in counter 15 is incremented by one at a fixed bit count rate from 0 until a fixed positive integer denominated Max Count is reached or until the voltage on capacitor 13 reaches a selected threshold voltage, whichever occurs first. The output signal from bit rate clock 4 is provided to counter 15 via gate circuit 14. The bit count rate and the period of the charging phase are selected so that the bit count rate times the period of the charging phase equals Max Count.

When the voltage on input line 16 of comparator 13 reaches the threshold voltage, $V_{th}$, (defined below) comparator 13 supplies a signal to gate circuit 14. The output signal of gate circuit 14 is then provided to counter 15 on lead 14b, causing the count in counter 15 to be provided on lead 15a to other circuitry (not shown) in the computer interface. As will be shown below, this count is indicative of the resistance value 10, which in turn represents a desired position on the display.

The companion input signal on lead 18 of comparator 13 is the output signal of voltage divider 17 which provides a voltage between $V_{cc}$ and ground. The setting of divider 17 establishes the magnitude of the threshold voltage, $V_{th}$, which in turn establishes the level which the voltage on lead 16 from capacitor 11 must reach in order to trigger comparator 13.

When an external resistor 10 of suitable magnitude provided by a position sensor of the first type is inserted between lead 5 input pin P, the voltage, V, across capacitor 11 rises according to the formula $V=V_{cc}(1-e^{-t/RC})$ as illustrated in FIG. 9 (where the dotted line indicates the threshold voltage $V_{th}$). The time required for the voltage across capacitor 11 to attain the threshold voltage, $V_{th}$ depends upon the values for R, C and k according to the well known equation $$t=RCk$$

where
R = value of external resistor 10;
C = capacitance of capacitor 11;
k = a constant depending on the threshold and supply voltages, $V_{th}$ and $V_{cc}$, respectively, and equals ln $(V_{cc}/(V_{cc}-V_{th}))$.

Thus the count in counter 15 when the voltage across capacitor 11 reaches $V_{th}$ is a digital representation of the time required for the voltage across capacitor 11 to rise from 0 to $V_{th}$. In turn the time required is directly proportional to the resistance R, which represents positional information.

An asynchronous computer interface operates similarly to the above described synchronous computer interface except that it typically operates on demand and except that as soon as comparator 13 signals gate circuit 14 that the voltage across capacitor 11 has reached $V_{th}$, an output signal from gate circuit 14 on lead 14a turns on clamping transistor 12 which discharges capacitor 11. The charging rate is sufficiently high that capacitor 11 is charged to the threshold voltage $V_{th}$ many times a second. The output signal of gate 14 is simultaneously provided to counter 15 on lead 14b so that the count on counter 15 is provided on lead 15a to other circuitry (not shown) within a computer or other system.

The values of the constants C and $V_{th}$ used in the equation $t=RCk$ are specified by the manufacturer. For example, in a typical Apple computer, $V_{th}=0.66\ V_{cc}$. Of importance, however, the time it takes the voltage across the internal capacitor in the computer interface to reach $V_{th}$ depends on C and $V_{th}$ as actually found in a particular computer interface, and not upon the nominal values specified by the manufacturer. Hence, the prior art method of deriving a measure of position information from the time required for the voltage across the internal capacitor to rise above $V_{th}$ is sensitive to variations in the actual values of C and $V_{th}$ in a specific system from nominal values.

In contrast, the interface circuitry of my invention provides a measure of position information which is virtually independent of these variations.

SUMMARY

Interface circuitry is provided for interconnecting a source of positional information such as a touch tablet with a computer interface. The circuitry includes means for acquiring the electrical voltage signals produced by a touch tablet and means for converting these voltage signals to a form which is recognizable by the computer interface. The touch tablet provides at least one voltage output signal representative of one positional coordinate. In one embodiment, it provides two voltage output signals representative, respectively, of the x coordinate and the y coordinate of a source of two-dimensional positional information. The x and y voltages are provided by the touch tablet in succession and are sampled by the interface circuit constructed in accordance with the present invention in alternation during successive segments of a master clock cycle. The sampled x and y voltages are each held and compared with a ramped voltage. When the ramped voltage is equal to a held voltage, a surge of current is supplied to the computer interface. This current rapidly increases the voltage level on a corresponding capacitor within the computer interface above a threshold voltage and thereby in a given charging cycle transfers the positional information to the computer interface. The time it takes for the voltage level on the capacitor in the computer interface to rise from the clamp level to the threshold voltage is understood by the computer interface to represent positional information, e.g., an x coordinate or a y coordinate.

BRIEF DESCRIPTION OF THE DRAWINGS

For a more complete understanding of the present invention reference may be had to the accompanying drawings which are incorporated herein by reference and in which:

FIG. 3 is a graphical representation of the clock signal produced by clock and frequency divider 20 shown in FIG. 2;

FIG. 4a is a timing diagram of the discharge signal provided by one embodiment of clock and frequency divider 20 to the discharge circuit 40 as shown in FIG. 2;

FIG. 4b is a timing diagram of the superimposed signals x sample and y sample from clock and frequency divider 20 shown in FIG. 2;

FIG. 5a is a timing diagram of the discharge signal provided by clock and frequency divider 20 in another embodiment of the interface circuit 100 of the present invention;

FIG. 5b is a combined timing diagram of the superimposed x and y sample signals for the embodiment of FIG. 5a;

FIG. 5c is a timing diagram of the x sample signal from clock and frequency divider 20 which has been extracted from the timing diagram of FIG. 5b;

FIG. 5d is a timing diagram of the y sample signal from clock and frequency divider 20 which has been extracted from the timing diagram of FIG. 5b;

FIG. 6 is a logic diagram 41 of discharge circuit 40 for implementing the discharge timing waveform in FIG. 4a;

FIG. 7 is a pictorial diagram of the two pairs of bars of touch tablet 38 of FIG. 2;

FIG. 8 is a schematic diagram of one embodiment of the logic of FIG. 6 for use with the interface circuit 100 of the present invention;

DETAILED DESCRIPTION

Figure 2:
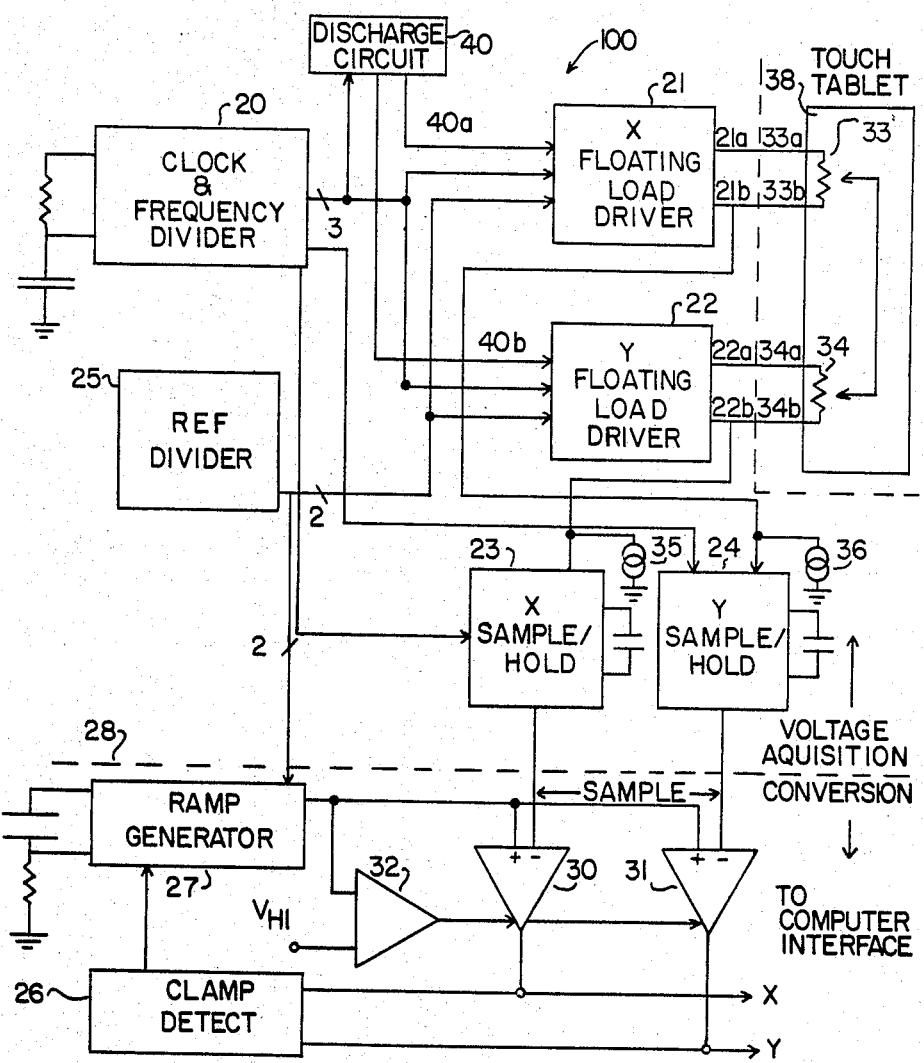
FIG. 2 is a block diagram of one embodiment of the interface circuit 100 of the present invention.

In FIG. 2 a block diagram of the functional blocks of interface circuit 100 of one embodiment of the present invention is shown. Interface circuit 100 may be implemented by using individual components, by integration in a gate array, or in a custom integrated circuit, depending upon the acceptable tradeoffs in performance and cost. Circuit 100 provides the means for interfacing an x-y touch tablet to a video game display or to the monitor screen of an Atari, Apple, IBM or other computer without using a potentiometer of the type used in the prior art, e.g. paddles, joysticks and the like. This invention is used with the Atari 800, the Atari 400, the Apple II, the IBM VIC20 or VIC64 computers and may be used with other computers. The portion of the structure shown in FIG. 2 above dotted line 28 shows the circuitry for the acquistion of voltages representing the x and y coordinates of the point a user depresses on a touch tablet of the type shown in co-pending U.S. patent application, Ser. No. 475,418, filed Mar. 15, 1983, on an invention of D. Thornburg entitled, "Touch Tablet Data Device," which is incorporated herein by reference. As the operator touches the tablet, the x and y coordinates of the point touched on the tablet 38 are specified and associated voltages are generated. As described in Thornburg '418, these voltages are sampled at the high rate established by clock and frequency divider 20 (FIG. 2) so that a single depression by the touch of a human operator will result in many x samples and in many y samples. When the electrical signal representing the x coordinate is sampled, as described subsequently, and intermediate signal representative of the amplitude of the sampled signal at the time of sampling is stored in sample and hold circuit 23; when the electrical signal representing the y coordinate is sampled, another intermediate signal representative of the amplitude of the sampled signal at the time of sampling is then stored in sample and hold circuit 24. These intermediate signals represent the coordinates (typically the x and y coordinates) of the point on the touch tablet touched by the stylus or the finger of a user. These intermediate signals are available for conversion and transmission to the circuitry which drives the computer interface.

As described in the copending Thornburg U.S. patent application, Ser. No. 475,418, a touch tablet suitable for use with this invention includes two resistive surfaces (not shown) which are placed in contact at particular points by the touch of a human operator. A first pair of parallel conductive bars x BAR-1 and x BAR-2 (shown in FIG. 7) is provided on opposite ends of the x-axis of one surface called the x surface; a second pair of parallel conductive bars y BAR-1 and y BAR-2 is provided on opposite ends of the y-axis of the other surface called the y surface. As one pair of conductive bars is electrified, i.e., as a first reference voltage $V_{high}$ is impressed on one of the two bars and a second reference voltage $V_{low}$ is impressed on the other of the two bars, an electric field is set up across the surface which contacts the two bars. As the surfaces are brought in contact by the touch of a human operator the nonelectrified pair of bars senses the potential between the point of contact and one of the electrified bars, thus identifying one coordinate of the position being touched. In accordance with the Thornburg invention the voltage impressed on the first pair of bars are alternately impressed on the second pair of bars. Voltages representative of x and y coordinates are thus provided in succession.

The sampling technique of the present invention is now described with reference to FIG. 2. X floating load driver 21 and Y floating load driver 22 are provided for impressing voltages $V_{high}$ and $V_{low}$, respectively, on the bars x BAR-1 and x BAR-2 on the ends of the x-axis on the x-surface of the touch tablet and at a different time on the bars y BAR-1 and y BAR-2 on the ends of the y-axis on the y-surface of the touch tablet. Activation of the respective floating load drivers is controlled by clock and frequency divider 20. Reference divider 25 provides the reference voltages $V_{high}$ and $V_{low}$ to floating load drivers 21 and 22 and to ramp generator 27. (The /2 symbol on the output line from reference divider 25 indicates two separate leads.) In one embodiment, clock and frequency divider 20 provides a 10 kHz clock signal with four periods of the clock signal constituting one sampling period for sensing x and y coordinates from touch tablet 38. Floating load drivers 21 and 22 alternately electrify their corresponding pair of bars on leads 21a and 21b and 22a and 22b, respectively, and an electric field is produced across the corresponding surface of the touch tablet between the electrified bars. Leads 21a, 21b, 22a, and 22b are connected to leads 33a, 33b, 34a, 34b, respectively, of touch tablet 38, as shown in FIG. 2 and FIG. 7. Which pair of bars is electrified is determined by the x-y select signal which is provided to the floating load drivers 21 and 22 by clock and frequency divider 20. The touch tablet 38 is schematically modeled by a pair of potentiometric devices 33 and 34 (as disclosed in the above-cited Thornburg et al. application). The voltage potential sensed in each device 33 and 34 depends upon the touch data provided by the operator, i.e. upon the point on the tablet depressed by the operator. This data is supplied intermittently, i.e., whenever a human operator depresses the touch tablet. The floating load drivers 21 and 22 are on alternately and the sensing is carried out during the assigned portions of the cycle. The sensing is carried out as explained below and in the copending U.S. application, Ser. No. 475,418 of Thornburg, et. al. The voltage sensed across resistance 33 is communicated to y-sample/hold 24 and the voltage sensed across resistance 34 is communicated to x-sample/hold 23, as shown in FIG. 2. The positional data thus acquired in the form of a voltage is available for conversion and transmission to the circuitry which drives the computer interface. The data may then be used to position a character on the display or monitor, or for any other desired purpose.

The sampling operation of the interface circuit 100 of the present invention (shown in FIG. 2) may be further understood by reference to the timing diagrams of FIG. 3 and FIGS. 4a-4b, the discharge circuit 40, shown in FIG. 2, and the discharge circuit logic 41 shown in FIG. 6. One embodiment of the discharge circuit logic 41 is shown in FIG. 8. The discharge function described below is performed by circuitry (not shown) in the x and y floating load drivers 21 and 22, respectively. This circuitry is represented symbolically by current sources 35 and 36 in FIG. 2 and serves to discharge the parasitic capacitor formed by the two surfaces of the touch tablet 35. This parasitic capacitor develops a surface-to-surface charge as one or the other of the surfaces is electrified.

The discharge circuit 40 receives the clock signal, discharge signal, and x-y select signal from clock and frequency divider 20. The discharge output signal from discharge circuit 40 on lead 40a causes x floating load driver 21 to provide $V_{low}$ on lead 21b and a y discharge output signal on lead 40b causes y floating load driver 22 to provide $V_{low}$ on lead 22b.

The logic circuitry of discharge circuit 40 is shown in more detail in FIG. 6. As shown in FIG. 6, the clock and discharge signals from clock and frequency divider 20 are provided to AND gate 41-1. The output signal from AND gate 41-1 is provided as one input signal to OR gates 41-2 and 41-3 whose other input signal is the x, y select signal from clock and frequency divider 20. The output signal on lead 40a is provided to x floating load driver 21 and the output signal on lead 40b is provided to y floating load driver 22.

The clock signal shown in FIG. 3 is produced in a well-known manner by clock and frequency divider 20 shown in FIG. 2. In a preferred embodiment this clock signal has a frequency of 10 kHz. Each clock cycle has a high phase followed by a low phase. The eight phases of four consecutive clock cycles are numbered $\phi$ through 7 in FIG. 3, beginning with the high phase of the first clock cycle. Each of these eight clock phases will be discussed in connection with the function that is carried out by the interface circuit 100 during that clock phase. The eight phases of the four consecutive cycles that constitute one sampling cycle are repeated approximately 2500 times per second, providing x and y positional data in the form of voltage signals once each sampling cycle. For this embodiment, the functions occuring during each of the phases are given as follows:

P$\phi$ x-surface driven (until phase 4), y-surface being discharged (i.e., circuit 35 of FIG. 2 is on)
P1 discharge circuit 35 off (recovery time)
P2 voltage on x-surface is sampled using y-surface as sensing means
P3 discharge circuit 35 off
P4 y-surface driven (until phase $\phi$), discharge circuit 36 on
P5 discharge circuit 36 off (recovery time)
P6 voltage on y-surface is sampled using x-surface as sensing means
P7 discharge circuit 36 off
During the first two phases P$\phi$, P1 of the above sequence the touch tablet is made ready to provide accurate x positional information by first discharging any residual charge on the surface of the tablet during phase P$\phi$ and then allowing the touch tablet parasitic capacitor (not shown) to settle after the discharge step during phase P1. If the operator is touching the tablet during phases P2 and P3, the conductive bars y BAR-1 and y BAR-2 on two parallel edges of the surface of the touch tablet receive a voltage which is stored in x-sample and hold block 23 (shown in FIG. 2). In phases P4 through P7, the same sequence occurs with a voltage being held in y-sample and hold block 24 after the sensing of a y-voltage by the x-bars (FIG. 7) on the opposite two parallel edges of the touch tablet. The two voltages now stored in the sample and hold blocks 23 and 24 represent the x and y coordinates of the point touched and thus depressed on the touch tablet.

Further insight into the sampling operation may be obtained by reference to the timing diagrams (for an alternate embodiment) of FIG. 3 and FIGS. 5a-5d. The circuitry of FIG. 2 and FIG. 7 is driven in this alternate embodiment in accordance with these timing diagrams. In this embodiment the discharge signal provided by clock and frequency divider 20 is shown in FIG. 5a, the x sample signal and y sample signal provided by clock and frequency divider 20 is shown in FIGS. 5c and 5d. This embodiment is used when the discharge circuits 35 and 36 must be on longer (because of lower current carrying capacities) and may also be used when the sample and hold circuits 23 and 24 do not require as much time to acquire these sample voltages. The functions occuring during each of the phases for this embodiment are as follows:

P$\phi$ x-surface driven (until P4), discharge circuit 35 on
P1 discharge circuit 35 on
P2 discharge circuit 35 off (recovery)
P3 voltage on x-surface is sampled using y-surface as sensing means, discharge circuit 35 off
P4 y-surface driven (until P$\phi$), discharge circuit 36 on
P5 discharge circuit 36 on
P6 discharge circuit 36 off, recovery
P7 voltage on y-surface is sampled using x-surface as sensing means, discharge circuit 36 off.

In this embodiment the sample period is shorter and the discharge period longer. In phases P$\phi$, P1 and P4, P5 the discharge circuit 35 or 36 is on to prepare the x-y tough tablet for generating a voltage representative of the position touched by the human operator. During phases P2 and P6 the circuitry recovers. In phase P3 the x-sample voltage (i.e., the voltage representing the x coordinate of the point touched on the touch tablet) is provided by sensing the y-surface. In phase P7 the y-sample voltage (i.e., the voltage representing the y coordinate of the point touched on the touch tablet) is produced by sensing the x-surface. The sampling cycle then repeats itself with the frequency established by clock and frequency divider 20, which provides the x sample signal to x sample/ hold circuit 23 and the y sample signal to y-sample/hold circuit 24.

As described above, the discharge circuitry 35 and 36 discharges the parasitic capacitor formed by the two surfaces of the touch tablet. The charge on the parasitic capacitor would produce false positional readings if it were not discharged. Depending upon leakage rates and the like, the detected voltages supposedly representative of positional data would flutter around a middle range. It would also be difficult to differentiate between a data state (a touched condition) versus a release state since the sensing circuitry does not distinguish between a voltage caused by touching and a voltage caused by parasitic capacitance. Thus, in the preferred embodiment, the interface circuitry of the present invention includes a discharge step at each electrification of one pair of conductive bars on the touch tablet 38 and before each sense step. A recovery period is added because the discharge step involves the dissipation of significant charge. The discharge circuit is on while the human operator is touching the high impedance tablet thereby causing an error in the sensed voltage. The recovery period allows the high impedance tablet to recover to provide an accurate voltage output. In still another embodiment a sense circuit (not shown) is used to sense the voltage even when the discharge circuit is on to verify that the tablet is in fact being touched and that the reading is not due simply to imperfect fabrication creating low resistance pathways between the x side and y side surfaces of the touch tablet. Such a "sticky" sense circuit allows higher leakages currents to exist between the two surfaces of the touch tablet 38.

In contrast to the technique of gradually charging capacitor 11 in the computer interface section 3, as described previously in connection with FIG. 1, the interface circuit of the present invention converts the x-sample voltage and the y-sample voltage into binary numbers within x-counter 15 and y-counter 15, respectively, in a very short time period. The advantage of this is that, for a reason which is explained below, any deviation in the value of C or $V_{th}$ from a nominal value introduces very little error in the position read by the computer. This circuit works as follows: The output voltage from ramp generator 27 and the voltage representing the x-coordinate from x sample/hold circuit 23 are compared in comparator 30 and the output voltage from ramp generator 27 and the voltage representing the y-coordinate from y sample/hold 24 are compared in comparator 31. The ramp generator 27 produces a voltage which starts at the low excitation voltage level, $V_{low}$ of the internal driving circuitry of the computer interface 3 and rises linearly to the high excitation voltage $V_{high}$ of the computer interface 3. The ramp generator 27 is synchronized with the computer interface 3 via clamp detect 26 so that the voltage in ramp generator 27 begins to rise linearly from $V_{low}$ when the clamping phase within the computer interface ends and the count in x-counter 15 and y-counter 15 begin from 0.

The ramp generator 27 is also scaled so that its voltage output signal provided to comparators 30 and 31 rises linearly from $V_{low}$ to $V_{high}$ in the time it takes for the count in x-counter 15 and y-counter 15 to be incremented from 0 to Max Count. When the value of the voltage representing a positional coordinate as supplied, e.g. by x sample/hold 23, is equal to the voltage supplied by the ramp generator 27 then a surge of current is supplied by comparator 30 to the x input pin, x-P, of the driving circuitry of the computer interface. This comparator may be a stand-alone unit if it has a sufficiently high current output or it may drive a current source (not shown). The supplied surge of current is sufficiently large to charge capacitor 11 in a very short time, preferably less than a single clock period of bit rate clock 4 shown in FIG. 1.

Figure 9:
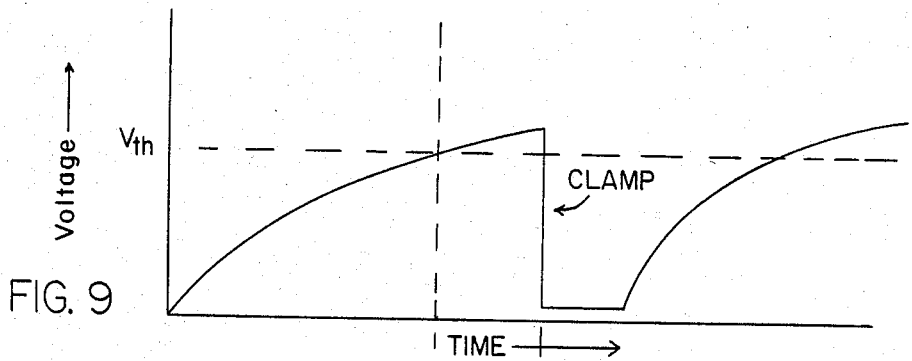
FIG. 9 is a graph of the voltage on node 1 of the computer interface section 3 of FIG. 1 for a prior art position sensor which provides a resistance (whose value contains positional information) which, when connected between the analog input terminals of a computer interface, establishes an RC circuit with the internal capacitance of the computer interface.
Figure 10:
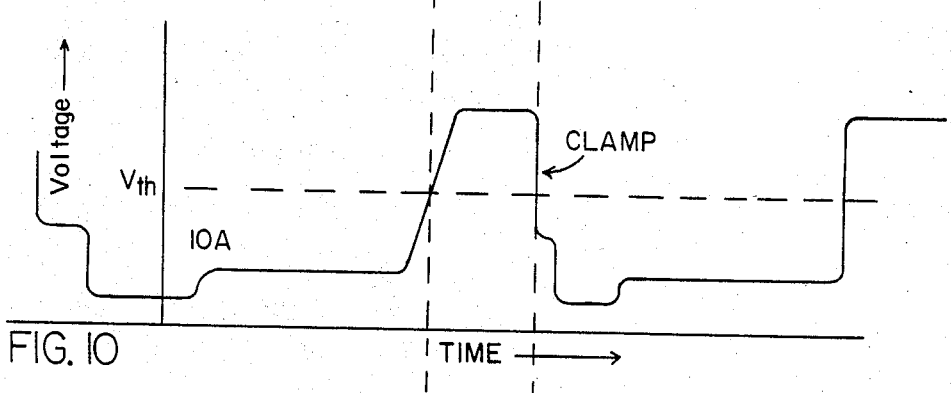
FIG. 10 is a graph showing the voltage on capacitor 11 of FIG. 1 within the computer interface section 3 as it is charged by the interface circuit 100 of the present invention.
Figure 11:
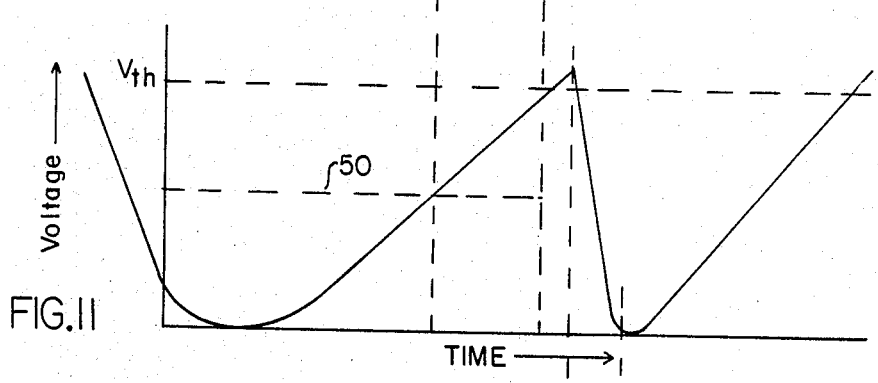
FIG. 11 is a graph of the ramp voltage of ramp generator 27 in the interface circuit 100 of FIG. 2.

The generation of the current surge or pulse is described in connection with FIGS. 9-11. FIG. 9 shows the voltage appearing on the driving circuitry in a conventional computer interface when an external resistance is connected to the internal capacitance in a RC network. For a given resistance, the voltage increases according to the formula $V = V_{cc}(1 - e^{-t/RC})$ from zero volts to a threshold voltage which is a parameter of the driving circuitry. As described previously, for computer interfaces of the asynchronous type, once the threshold voltage is sensed and the time-based positional information contained therein is communicated to companion circuitry in the CRT, a clamping circuit discharges capacitor 11 to reset it to repeat the cycle to accept further positional information. The bit rate clock for a Commodore computer interface senses the voltage on capacitor 11 approximately every 1 μsec (i.e., the period of bit rate clock 4 is approximately 1 microsecond). IBM computer interfaces sense this voltage every 10 μsec. Atari computer interfaces sample the voltage every 63 μsec.

Figure 1:
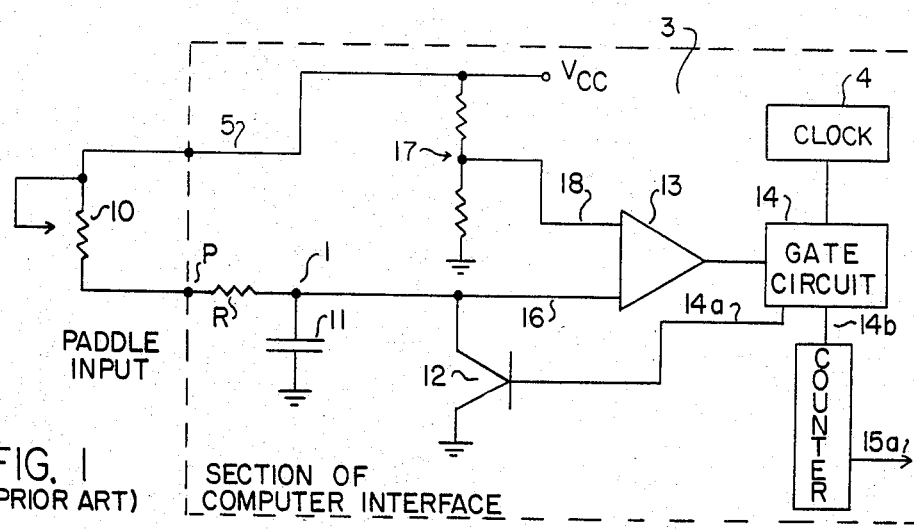
FIG. 1 is a simplified schematic diagram of a paddle-to-computer interface of the prior art along with a section of a typical computer or computer game interface 3.

The measuring characteristics of the computer interface are fixed by the manufacturer, in particular, the time required for counter 15 to increase its count from 0 to Max Count is particularly well controlled, i.e., set by crystal controlled bit rate clock 4 (FIG. 1). The interface circuitry of the present invention utilizes this known characteristic of the driving circuitry of the computer interface to provide, at a selected time, electrical signals to the computer interface which it interprets as positional information. The technique of the present invention is preferred over the technique of the prior art because variations in the values for C and for $V_{th}$ will have very little effect on positional accuracy since the time at which the current surge is supplied depends on the characteristics of the ramp generator which are independent of variations in C and $V_{th}$ actually found in a particular computer interface. Moreover, the voltage across capacitor 11 rises so rapidly that deviations in the values of C and $V_{th}$ from nominal values have little or no effect on the positional information read by the computer. The interface circuitry 100 thus functions virtually independently of the specific values of C and $V_{th}$ in a particular embodiment. In the present invention, the interface circuitry 100 determines the accuracy of reading positional information and not the computer as delivered by the factory.

Figure 13:
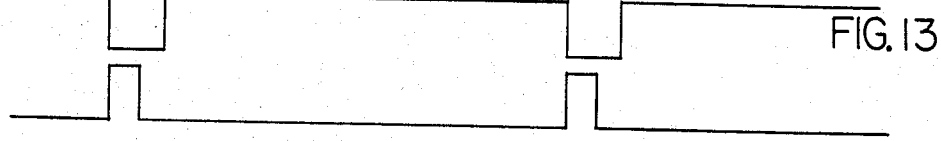
FIG. 13 is a timing diagram for one embodiment of the logic of the output signal of clamp detect circuit 26 incorporated in the interface circuit 100 shown in FIG. 2.

At the time that the internal capacitor 11 is discharged, the clamp detect circuit 26 included in the interface circuitry 100 detects the rapid decrease in voltage. At this time the ramp voltage from ramp generator 27 is reset to $V_{low}$. It is important that the clamp detect circuit 26 promptly signify the release or unclamping of the internal capacitor 11 within the computer interface since the circuitry within the computer interface thereupon begins to measure the time until either capacitor 11 is next charged to the voltage level where the threshold voltage is exceeded or the charging cycle is completed. As shown in FIG. 11, upon receipt of a signal (as shown in FIG. 13) from clamp detect circuit 26 the ramp voltage from ramp generator 27 begins to rise. When the ramped voltage is equal to the voltage supplied to comparator 30 by x-sample/hold 23 or to the voltage supplied to comparator 31 by y-sample/hold 24 (as shown by dotted lines 50 in FIG. 11), then the corresponding comparator 30 or 31 provides a high current to charge the x-capacitor 11 or y-capacitor 11 in a very short period of time as shown by the steep rise in voltage above the threshold level shown in FIG. 10. The current supplied to the computer interface as shown in FIG. 10 comes from two sources. The primary source is the comparator 30 or 31 which produces the surge above threshold. The secondary source is the clamp detect circuit 26 itself which supplies a current as it senses the voltage in the computer interface. The effect of this secondary source of current can be seen as the initial rise after voltage clamp designated as 10a on FIG. 10.

Figure 12:
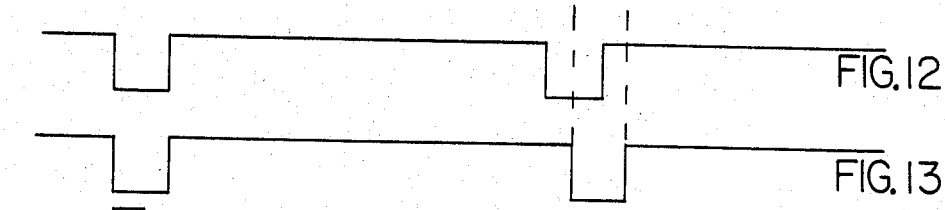
FIG. 12 is a timing diagram of the logic of the clamp signal from gate circuit 14 in the computer interface section 3 shown in FIG. 1.

FIG. 12 is a timing diagram for the logic of the clamp signal provided by the gate circuit 14 of computer interface section 3 shown in FIG. 1. FIG. 13 is a timing diagram for one embodiment of the logic of the output signal of clamp detect circuit 26 of interface circuit 100. Note that the curve of FIG. 13 is offset slightly from the curve of FIG. 12 to indicate that there is a slight delay between the time the clamp signal is provided to transistor 12 and the time the clamp detect circuit 26 senses the clamped condition of transistor 12 and resets ramp generator 27.

Figure 14:
FIG. 14 is a timing digram of the state of the output signal shutoff comparator 32 which shuts off the comparators 30 and 31, as shown in FIG. 2.

FIG. 14 is a timing diagram of the state of the output signal of shutoff comparator 32. Note that the output signal shuts off comparators 31 and 32 when the output signal from ramp generator 27 reaches $V_{high}$. This enables the clamp detect circuit 26 to function properly.

In one embodiment, the voltage supplied by clamp detect circuit 26 to the internal driving circuitry of the computer interface prior to the ramp reaching the value in x and y sample/hold circuits 23 and 24 is only slightly less than threshold voltage $V_{th}$. This is preferred because it permits the threshold $V_{th}$ to be reached faster once the ramp and sample/hold voltages are equal and because it helps to reduce the time necessary to detect the clamp release state.

Figure 15:
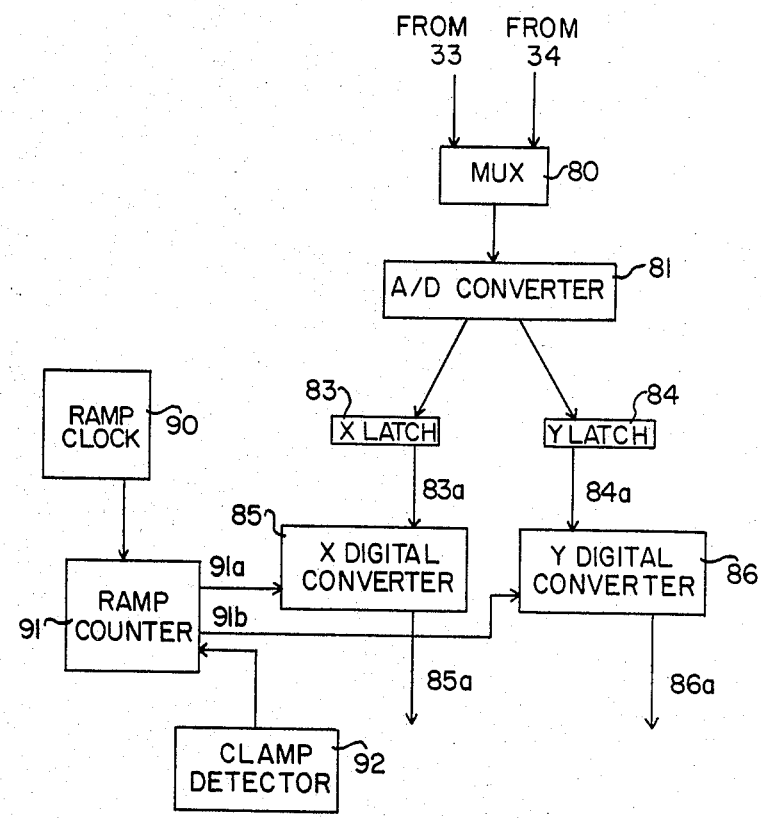
FIG. 15 shows a schematic diagram of a digital embodiment of the invention.

FIG. 15 shows a digital embodiment of the invention. The x-voltage representation from x coordinate sensor 34 as shown in FIG. 2 and the y-voltage representation from y coordinate sensor 33 as shown in FIG. 2, are multiplexed by multiplexer 80 and sent to analog-to-digital converter 81. The digital representation of the x-voltage representation is stored in x latch 83 and the digital representation of the y-voltage representation is stored in y latch 84.

Ramp counter 91 begins its count at COUNT LOW when reset by clamp detector 92. The count in ramp counter 91 is provided to x-digital comparator 85 and y-digital comparator 86 on buses 91a and 91b, respectively. The x digital representation stored in x latch 83 and the y digital representation stored in y latch 84 are provided to x digital comparator 85 and y digital comparator 86 on buses 83a and 84a, respectively. When the count provided by ramp counter 91 equals the digital representation of the x voltage representation, the x digital comparator supplies a surge of current to rapidly charge internal capacitor 11 of computer interface 3 so that the voltage on capacitor 11 rises above the threshold voltage $V_{th}$.

Ramp counter 91 is synchronized and scaled by clamp detector 92 and ramp clock 90 so that the count in ramp counter 91 increases linearly from a selected COUNT LOW to a selected COUNT HIGH while the x and y counters 15 internal to computer interface go from 0 to MAX COUNT. The y digital comparator functions analogously.

The above embodiments have been explained in detail in connection with a two-dimensional touch tablet. In an N-dimensional embodiment, a sequence of N voltage samples $V_1, V_2, \ldots V_N$ (in each sample cycle) (where N is a fixed positive integer) representing the coordinates of a point in N-dimensional space is compared with the voltage signal output of a ramp generator in N comparators $C_1, \ldots C_N$ which in turn rapidly charge the corresponding internal capacitor 11 when the ramped voltage equals the value of a voltage sample.

In other embodiments, the invention is used with position sensors of the first type (i.e., one which provides an electrical resistance whose value represents position information) by first providing a voltage signal which is proportional to the resistance supplied by the sensor. This voltage signal is then compared with the voltage output signal of the ramp generator 27.

In other embodiments of my invention, for position sensors which provide voltages representing position information, a sample and hold circuit is not necessary because the position sensor itself provides a steady state voltage signal for each coordinate of the point touched.

The embodiments of the invention described above are meant to be exemplary and not limiting. Many variations and substitutions will be obvious to one of average skill in the art in view of the above disclosure without departing from the spirit and scope of the invention.

I claim:

1. A voltage interface circuit for interconnecting a source of positional data with internal circuitry of a computer interface containing at least one internal capacitor comprising:

means for acquiring a voltage representation of at least a portion of positional data being supplied by said source of positional data;

means for providing an output signal which increases linearly in a selected time period from a first selected value to a second selected value;

means for detecting when said output signal equals said voltage representation; and means, responsive to said means for detecting, for charging a selected one of said at least one internal capacitors above a given threshold voltage in response to the value of said output signal becoming equal to said voltage representation.

2. An interface circuit as in claim 1 wherein said means for providing an output signal comprises a ramp generator for providing a voltage signal and said means for detecting comprises a comparator means having a first input lead for receiving said voltage representation and a second input lead for receiving said output signal provided by said means for providing.

3. An interface circuit as in claim 2 including a clamp detect circuit to detect when said internal capacitor is discharged, said clamp detect circuit being connected to said ramp generator means to reset said ramp generator means upon the detection of said discharge of said capacitor.

4. An interface circuit as in claim 1 wherein said means for acquiring a voltage representation includes a discharge means for discharging parasitic capacitators within said source of positional data.

5. An interface circuit as in claim 4 wherein said means for acquiring a voltage further includes means for detecting the voltage in said source of positional data when said discharge means is activated in order to detect the presence of low resistance pathways in said source of positional data.

6. An interface circuit as in claim 2 wherein said means for acquiring said voltage representation of at least a portion of said data comprises means for acquiring a first voltage representing the x-position coordinate and means for acquiring a second voltage representing the y-position coordinate from said source of positional data and wherein said means for detecting includes an x-comparator means and a y-comparator means connected, respectively, with said means for acquiring a voltage representing said x-position coordinate and said means for acquiring a voltage representing said y-position coordinate.

7. An interface circuit as in claim 6 wherein said source of positional data comprises a first resistance-based potentiometric device and a second resistance-based potentiometric device and wherein said means for acquiring said first voltage and said second voltage, comprises:
an x floating load driver for impressing a excitation potential across said first resistance-based potentiometric device to produce said first voltage; and
a y floating load driver for impressing an excitation potential across said second resistance-based potentiometric device to produce said second voltage.

8. An interface circuit as in claim 7 in combination with an x sample-and-hold device and a y sample and hold device, said x sample-and-hold device being connected between said second resistance-based potentiometric device and said x-comparator means and said y sample and hold device being connected between said first resistance-based potentiometric device and said y-comparator means.

9. An interface circuit as in claim 7 in combination with a clock and frequency divider connected to said x floating load driver, to said y floating load driver, to said x sample and hold device and to said y sample and hold device to establish a sampling and discharge cycle.

10. An interface circuit as in claim 1 wherein said internal circuitry has a minimum excitation voltage and a maximum excitation voltage and said means for providing includes means for establishing said first selected voltage as said minimum excitation voltage and said second selected voltage as said maximum excitation voltage.

11. An interface circuit as in claim 1 wherein said computer interface includes means permitting said computer interface to operate asynchronously.

12. An interface circuit as in claim 1 wherein said computer interface includes means permitting said computer interface to operate synchronously.

13. An interface circuit as in claim 9 wherein said source of positional data is a touch tablet.

14. An interface circuit as in claim 1 wherein said means for acquiring a voltage representation includes an analog-to-digital converter for presenting said voltage representation as a digital number and wherein said means for providing an output signal comprises a counter for generating a digital count, and wherein said means for detecting comprises a digital comparator means.

15. A method for operating an interface circuit which transfers positional data from an external source to a computer interface, comprising:
acquiring a voltage represention of positional data from said source;
providing an output signal which increases linearly in a selected time period from a first selected value to a second selected value;
detecting when said output signal equals said voltage representation, and signaling said computer interface when said output signal equals said voltage representation.

* * * * *

UNITED STATES PATENT AND TRADEMARK OFFICE
CERTIFICATE OF CORRECTION

PATENT NO. : 4,581,483
DATED : April 8, 1986
INVENTOR(S) : Paul W. Ralston

It is certified that error appears in the above-identified patent and that said Letters Patent is hereby corrected as shown below:

```
Column 1, line 52, "snesors" should read --sensors--.
Column 6, line 39, "/2" should read --\2--.
Column 7, line 44, "∅" should read --∅--.
Column 7, line 55, "P∅" should read --P∅--.
Column 7, line 61, "∅" should read --∅--.
Column 7, line 67, "P∅" should read --P∅--.
Column 8, line 3,  "P∅" should read --P∅--.
Column 8, line 33, "P∅" should read --P∅--.
Column 8, line 38, "P∅" should read --P∅--.
Column 8, line 46, "tough" should read --touch--.
```

Signed and Sealed this

Nineteenth Day of August 1986

[SEAL]

Attest:

DONALD J. QUIGG

Attesting Officer

Commissioner of Patents and Trademarks